United States Patent
Sato et al.

(10) Patent No.: US 6,238,186 B1
(45) Date of Patent: May 29, 2001

(54) METHOD OF MANUFACTURING A BLADE FOR FLUID MACHINERY

(75) Inventors: Shinsaku Sato; Yoshitake Mibe; Kenji Obata; Hajimi Tai, all of Kanagawa-ken; Kazutoshi Takaishi, Tokyo; Masahiko Nakazono, Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/389,025

(22) Filed: Sep. 2, 1999

(30) Foreign Application Priority Data

Nov. 12, 1998 (JP) ................................... 10-322294

(51) Int. Cl.$^7$ ...................................... B63H 1/26

(52) U.S. Cl. ...................................... 416/223 R; 29/889.7
(58) Field of Search ................................. 416/223 R, 239, 416/241 R, 223 A; 29/889.7, 557

(56) References Cited

U.S. PATENT DOCUMENTS 4,164,061 * 8/1979 Bronovsky et al. ................ 29/889.7
5,083,371 * 1/1992 Leibfried et al. ................... 29/889.7

* cited by examiner

Primary Examiner—Edward K. Look
Assistant Examiner—James M McAleenan
(74) Attorney, Agent, or Firm—Foley & Lardner

(57) ABSTRACT

A method for manufacturing a blade for fluid machinery from a plate-shaped component which is first machined to make a blade preform. The preform is then worked to obtain a blade in its final form. The shape of the preform is determined by one of two analytical methods.

9 Claims, 6 Drawing Sheets

FIG. 1
PLATE-SHAPED COMPONENT 10
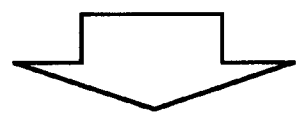  STEP 1
PREFORM 20
  STEP 3
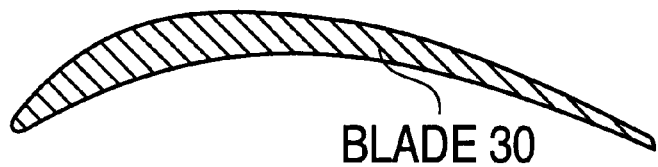
BLADE 30

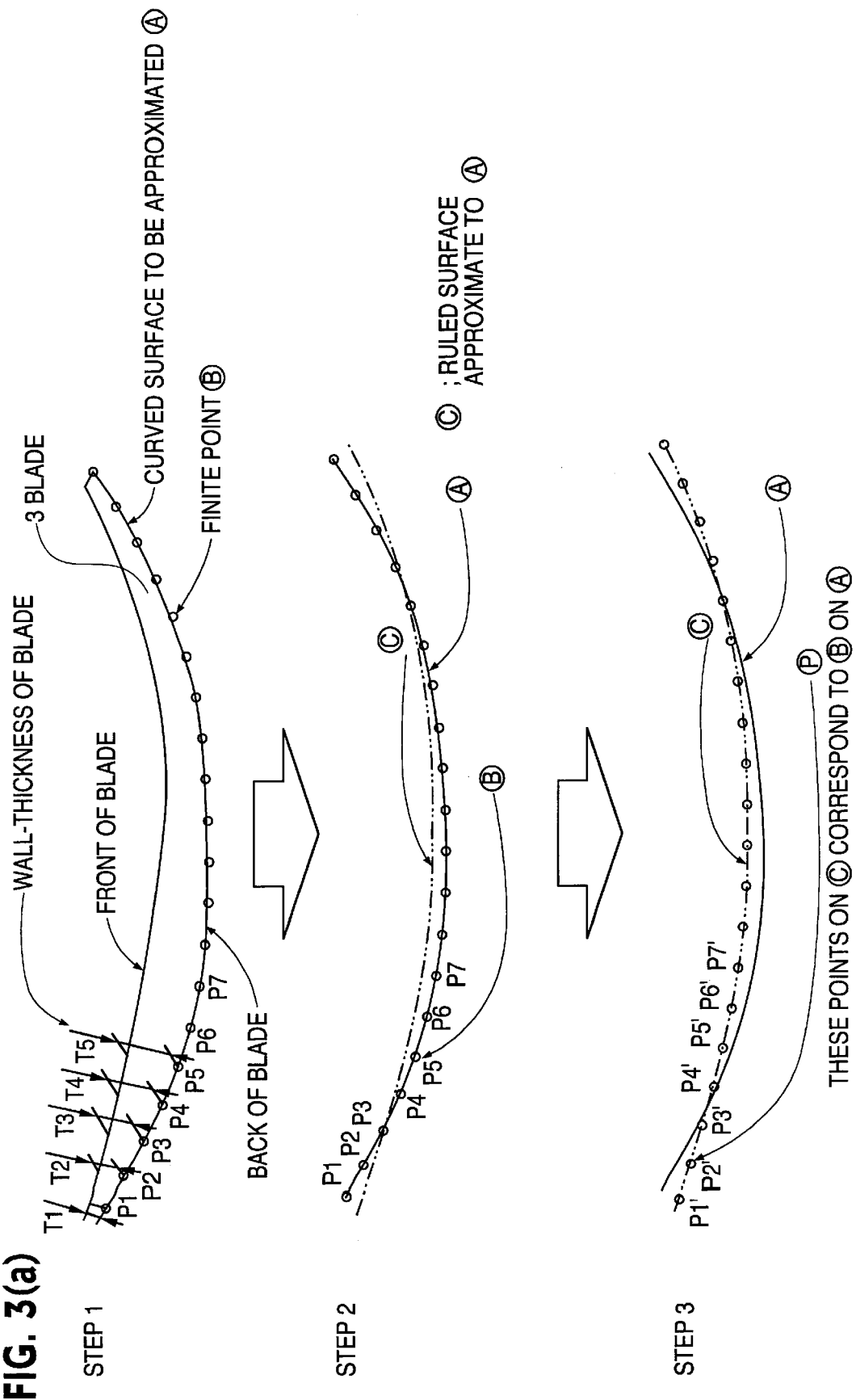

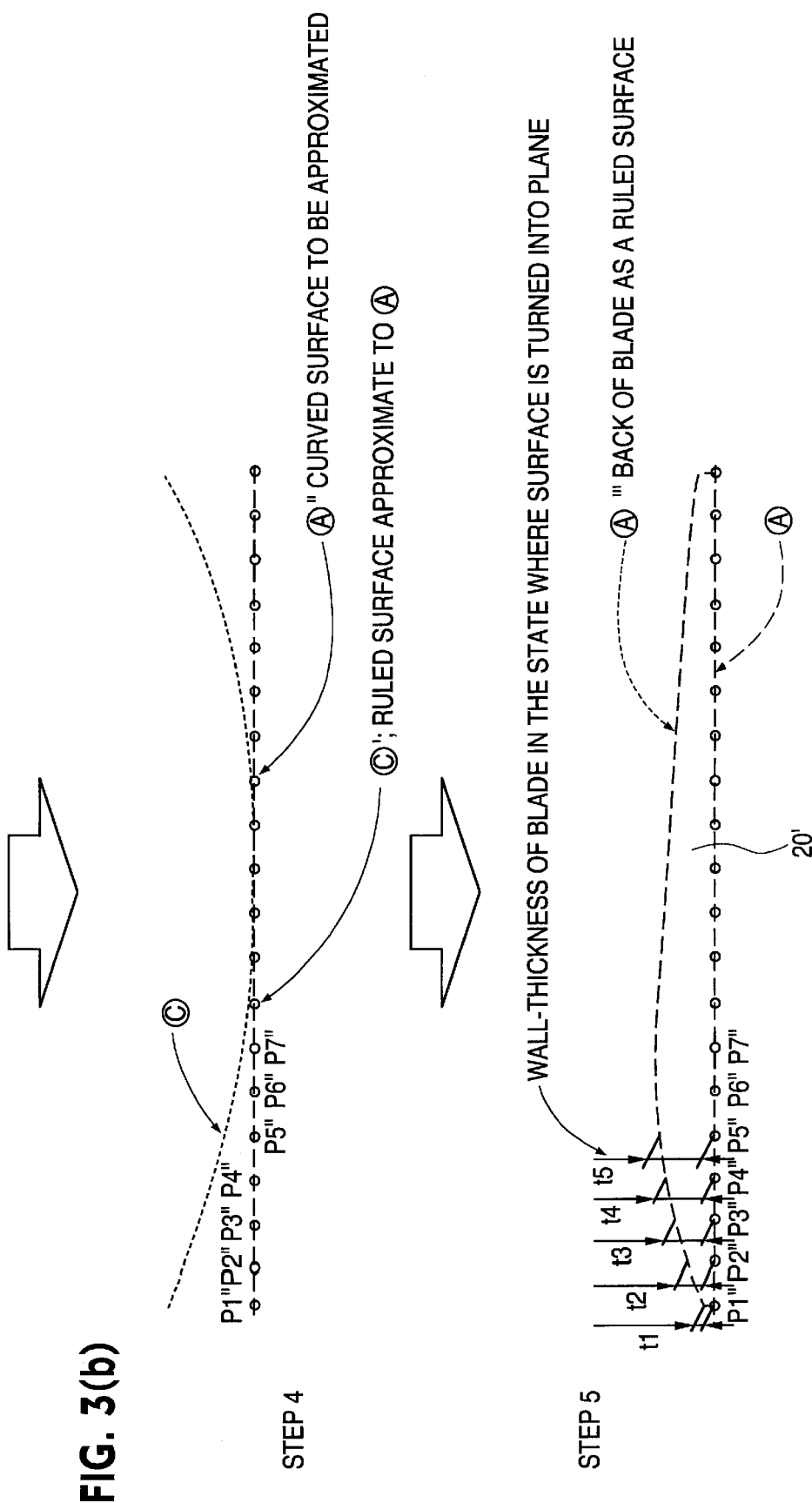

FIG. 5
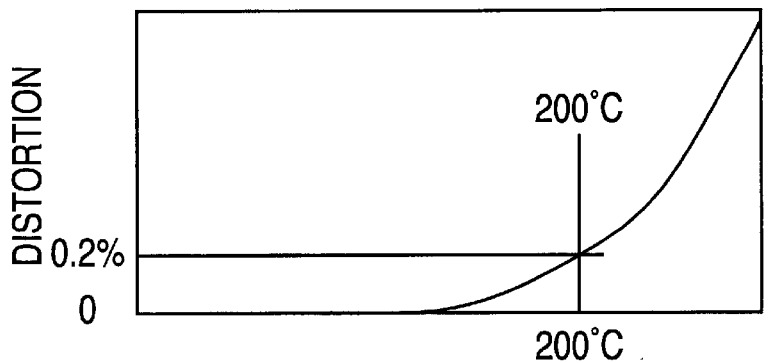
MAXIMUM TEMPERATURE VARIATION
FIG. 6
(PRIOR ART)
STEP 1
PREFORM
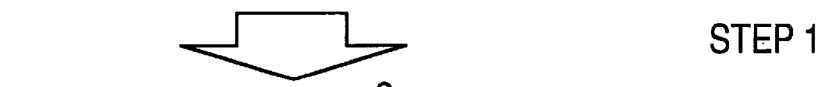
STEP 2

1

METHOD OF MANUFACTURING A BLADE FOR FLUID MACHINERY

BACKGROUND OF THE INVENTION

1. Field of the Invention

The present invention relates to a method of manufacturing a blade which is one component of a runner, an impeller, etc. for fluid machinery, such as a pump, a water-turbine or a pump-turbine.

2. Description of the Related Art

FIG. 6 illustrates a conventional method of manufacturing a blade for fluid machinery by working, such as plastic working, a plate-shaped component. As step 1, a plate-shaped component 1 is deformed (worked) to obtain an intermediate formed material 2 (preform) which has a predetermined shape, keeping a constant thickness. Then, as step 2, at least one side of the preform 2 is machined, such as by computer numerical control (CNC) machining, into a final blade form (blade 3) having the desired blade cross-section(s).

The above-described method is generally efficient for simple blade shapes. However, in the case of a blade having a complex three-dimensional-curved surface, the machining step is much more involved, thus reducing manufacturing efficiency.

Moreover, due to the complex curved surfaces of the preform, it is often difficult to firmly clamp the preform in a fixture so that accurate machining can be performed.

SUMMARY OF THE INVENTION

It is an object of the present invention to provide a method of manufacturing a blade for fluid machinery which overcomes the disadvantages of the prior art described above.

It is a further object of the present invention to provide a method of manufacturing a blade for fluid machinery which enables efficient and reliable manufacture.

These and other objects are accomplished by a method of manufacturing a blade for fluid machinery from a plate-shaped component, comprising the steps of: first machining at least one side of the plate-shaped component to make a preform of predetermined shape; and then working the preform into a final predetermined blade shape.

BRIEF DESCRIPTION OF THE DRAWING

A more complete appreciation of the invention and the attendant advantages thereof will be readily obtained and better understood by reference to the following detailed description when considered in connection with the accompanying drawing, in which:

FIG. 1 is a flowchart of the blade manufacturing method according to the invention;

FIG. 3 is a schematic of a second method of determining the shape of a blade preform;

FIG. 5 is a graph showing the relationship of distortion and maximum temperature variation in a blade after mold working; and FIG. 6 is a flowchart of a conventional method for manufacturing a blade.

DETAILED DESCRIPTION OF THE PREFERRED EMBODIMENTS

FIG. 1 schematically illustrates the manufacturing method according to the invention. The method begins with step 1 in which a plate-shaped component 10 of a desired blade material is given the outline of a blade form. Next, as step 2, at least one side of the plate-shaped component 10 is machined to obtain an intermediate formed material (preform) having blade cross-section(s) of varying thickness. Any suitable machining process may be used in this step, such as cutting, grinding or the like. Then, as step 3, the preform 20 is converted to its final predetermined blade form (a blade 30). This "working" step may be performed by any suitable shaping technique, such as hot plastic working or cold plastic working of the preform between shaping tools (a "mold") mounted in a press.

A blade formed in this manner with a complex final shape usually cannot be geometrically developed to a plane. The blade also has a nonuniform wall-thickness distribution. Therefore, it is not a simple matter to predetermine the shape of the preform 20 which will result in the proper blade form after fabrication. Accordingly, for this invention, the shape of the preform 20 is predetermined by one of the two methods described below.

The first method for predetermining the shape of the preform 20 is as follows. First, the difference in shape of one blade surface, from preform to final blade form, is applied as a forced displacement in a vertical direction (the direction in which the mold moves) to a virtual model of the preform. By doing so, the shape of the preform can be determined by using well-known elastic analysis or elastic plasticity analysis techniques, based on consideration of material properties and using a boundary condition, which simulates in approximation the reverse of the working step.

Figure 2A:
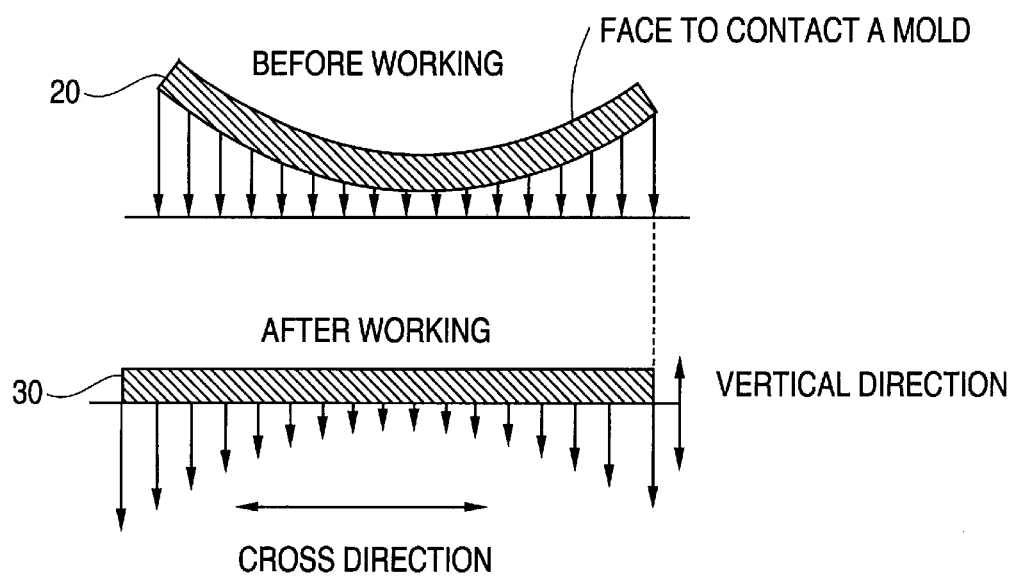
FIG. 2a is a schematic of a first method of determining the shape of a blade preform.
Figure 2B:
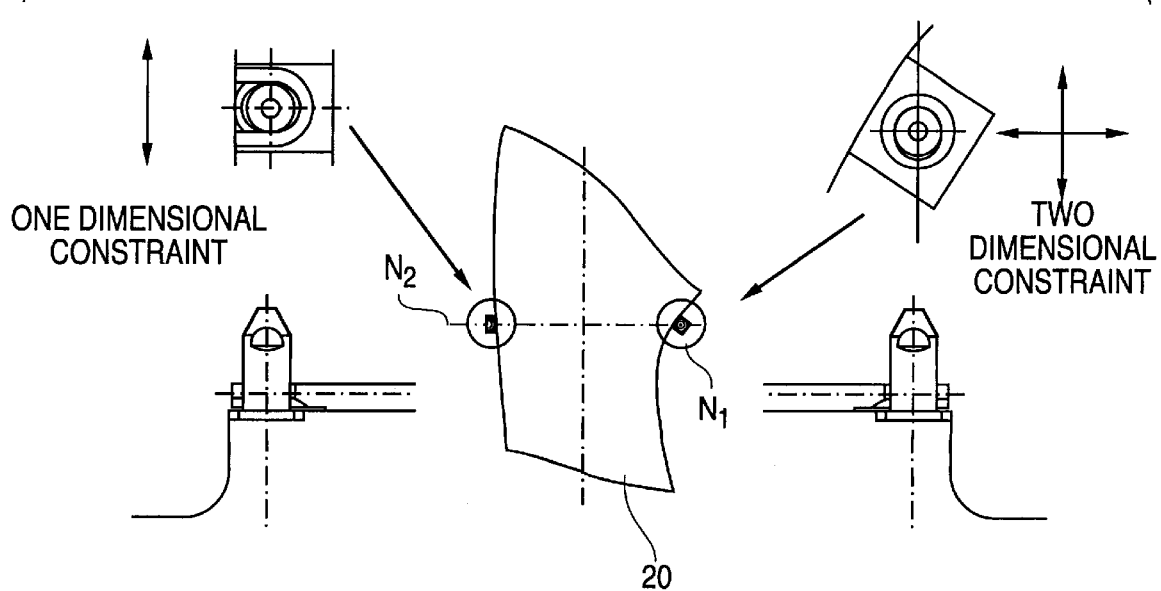
FIG. 2b is a schematic illustrating constraints on the blade preform during the final working step of the method of the invention.

Specifically, a model of the final blade form is developed by a three-dimensional finite element method (FEM) analysis. For the FEM model, one blade surface is chosen, preferably the one which has fewer undulations and is closer to a plane. As shown in FIGS. 2a and 2b, a constrained condition and the forced displacement by which this surface would be converted into a plane are applied to the model. Material properties to be taken into consideration are elastic modulus, yielding stress, Poisson's ratio, etc. at the time of the working. The forced displacement in this method is only applied in a vertical direction (the direction in which the mold moves during working); and there is no constraint in the cross direction (perpendicular to the vertical), except as follows.

Referring to FIG. 2b, two points $N_1$, $N_2$ are selected on the surface to which the forced displacement is to be given to the model. The first point $N_1$ is constrained in two dimensions in the plane perpendicular to the direction of forced displacement, while the second point $N_2$ is constrained in only one dimension in that plane. This constrained (boundary) condition for FEM analysis simulates the actual preform constraint during the working step (see below). The constraint stabilizes the model to minimize elongation and/or shrinkage of the preform as it is transformed into the final blade form by effectively constraining every point on the surface in a controlled manner, thus enabling analysis by the FEM method.

A second method for predetermining the shape of the preform 20 is shown in FIG. 3. First, the shape of the front surface or the back of the finished blade is approximated as a curved surface for which a two-dimensional development is possible. This can be done by computer or by conventional drafting techniques. Such a curved surface, also known as a "ruled surface," is one which is generated by a straight line, e.g., a cone or a cylinder. In FIG. 3, step 1, the back of blade 3 (surface A) is chosen for this approximation. The ruled surface which approximates surface A is shown in step 2 as surface C. As between the front surface and the back of the blade 30, the face preferably chosen for this approximation is the one which has less undulation and is flatter (i.e., is closer to a plane). A plurality of points $P_1, P_2, P_3, \ldots$ along surface A are used for further analysis and performance of this method.

In step 3, points $P_1, P_2, P_3, \ldots$ are transferred from surface A to surface C as points $P_1', P_2', P_3', \ldots$ Each point is transferred by projection onto surface C along a line normal to surface A. Thereafter, in step 4, surface C is flattened to a plane, the points $P_1', P_2', P_3', \ldots$ remaining in their fixed positions on surface C. The planar surface, A'', thus has points $P_1'', P_2'', P_3'' \ldots$ which correspond to points $P_1, P_2, P_3, \ldots$ on surface A.

In step 5, the wall thickness distribution of the final blade form is developed on planar surface A''. This is done by projecting the wall thickness $t_1, t_2, t_3, \ldots$ associated with each point ($P_1, P_2, P_3, \ldots$ in step 1) upwardly from points $P_1'', P_2'', P_3'', \ldots$ along lines normal to surface A''. The wall thickness $t_1, t_2, t_3, \ldots$ for each point is measured (step 1) along a line normal to the front surface of the blade. In the example shown, the result is a ruled surface A''' which, combined with planar surface A'', represents the predetermined shape of the preform 20'.

Figure 4:
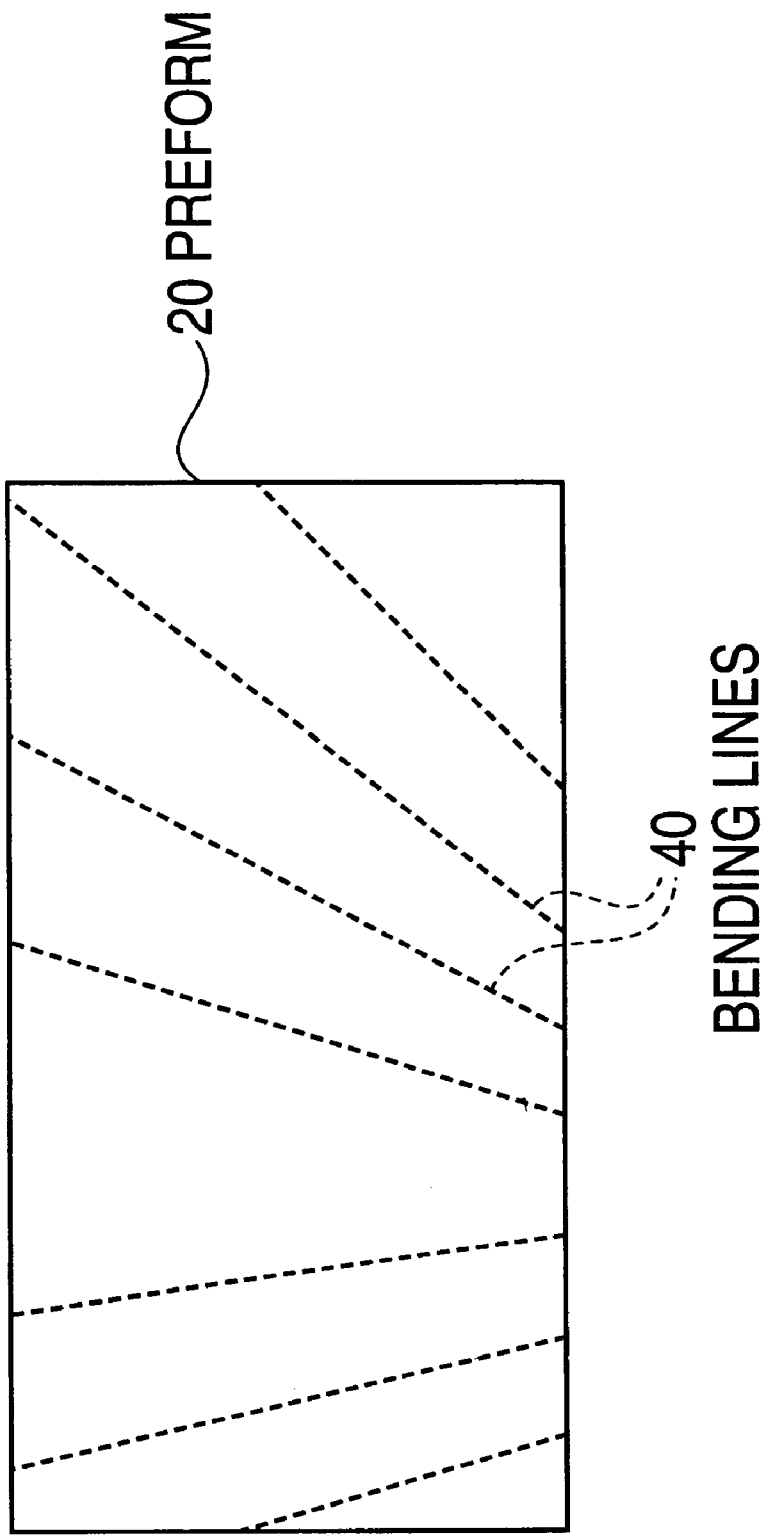
FIG. 4 is a top plan view of a preform and the lines along which it is to be bent.

In the method according to the invention, as the preform 20 is to be worked by a "hot" or "cold" fabrication technique, such as plastic working, the following intermediate pretreatment is preferred in order to minimize distortion in the blade. Namely, before the preform 20 is subjected to final working, it is bent into a curved composite form (which combines conical and/or cylindrical components) along plural (preferably at least three) bending lines such as the radiating bending lines 40 shown in FIG. 4. Each bending line 40 may be given a different curvature. The angular relationship of the bending lines is a function of the final blade shape; in some cases they may be parallel. With this intermediate bending, preform 20 is made to approximate the final shape of blade 30. When final working of the preform 20 is performed, the amount of distortion in the blade is minimized. Further, the degree of "springback" of the blade after working is minimized, thus improving the accuracy of the manufacturing process.

When the preform 20 is bent along the plural bending lines 40 and placed in the mold, the preform 20 is fixed to the mold at two points on the face. One point $N_1$ is chosen to stop 2-dimensional movement during molding in a plane transverse to the movement of the mold; the other point $N_2$ is chosen to stop one dimensional movement in that plane to absorb elongation and/or shrinkage of the preform 20 at the time of molding. FIG. 2b schematically illustrates this situation.

If the plate-shaped component 10 is composed of a stainless steel material as a major component and the final working of the preform 20 is performed by hot plastic working, it is preferable to remove the blade from the mold only when the temperature variation of the blade is less than about 200° C. If there is larger temperature variation at the time the blade is removed from the mold, excessive distortion can occur in the blade.

FIG. 5 shows the relationship between the distortion in the blade material and the maximum temperature variation at the time of removal from the mold. As shown in FIG. 5, to keep distortion below an allowable limit of 0.2% for fluid machinery, a maximum temperature variation of less than about 200° C. is necessary.

The blade manufacturing method of the invention thus uses a machined preform 20 which approximates the final shape of the blade 30. This renders machining of the blade after final working unnecessary. Thus, the process of forming the three-dimensional blade surface is simplified, and machining efficiency increases.

Moreover, it is easier to clamp the plate-shaped component 10 for machining, as compared to clamping a curved workpiece. Therefore, machining time is sharply reduced, and the overall manufacture time of the blade 30 is minimized.

The present invention may be embodied in other specific forms without departing from the spirit or essential attributes thereof and, accordingly, reference should be made to the appended claims, which define the scope of the invention.

Japanese priority Application No. PH10-322294, filed on Nov. 12, 1998, including the specification, drawings, claims and abstract, is incorporated herein by reference.

We claim:

1. A method of manufacturing a blade for fluid machinery from a plate-shaped component, comprising the steps of:
   first machining at least one side of the plate-shaped component to make a preform of predetermined shape, comprising the steps of:
     approximating at least one surface of the final blade shape by a ruled surface which simulates said at least one blade surface; and
     machining said plate-shaped component to form said preform by using the data obtained in said approximating step; and then
   working said preform into a predetermined final blade shape.

2. A method of manufacturing a blade for fluid machinery from a plate-shaped component, comprising the steps of:
   first machining at least one side of the plate-shaped component to make a preform of predetermined shape; and then
   working said preform into a predetermined final blade shape, comprising hot-plastic working of said preform in a mold, wherein the temperature of the preform when released from the mold after hot-plastic working varies by less than about 200° C.

3. A method according to claim 2, wherein the blade is made of stainless-steel.

4. A method according to claim 2, wherein the blade is made of carbon-steel.

5. A method of manufacturing a blade for fluid machinery from a plate-shaped component, comprising the steps of:
   first machining at least one side of the plate-shaped component to make a preform of predetermined shape;
   bending said preform along a plurality of bending lines to form a composite curved surface comprising plural ruled surfaces, each of said ruled surfaces being associated with a separate bending line; and then
   working said preform into a predetermined final blade shape.

6. A method according to claim 5, wherein said bending step comprises bending said preform along at least three bending lines, each of said ruled surfaces having a different curvature.

7. A method of manufacturing a blade for fluid machinery from a plate-shaped component, comprising the steps of:

first machining at least one side of the plate-shaped component to make a preform of predetermined shape; and then working said preform into a predetermined final blade shape, comprising fixing said preform on a mold at two points which lie in a plane transverse to the movement of the mold, one of said points being constrained in two dimensions in said plane, and the other of said points being constrained in one dimension in said plane, so as to minimize elongation and shrinkage of said preform during working.

8. A blade made by the method of claim 5.

9. A method according to claim 2 or claim 5, wherein said working step comprises fixing said preform on a mold at two points which lie in a plane transverse to the movement of the mold, one of said points being constrained in two dimensions in said plane, and the other of said points being constrained in one dimension in said plane, so as to minimize elongation and shrinkage of said preform during working.

* * * * *